United States Patent [19]

Matsuki et al.

[11] Patent Number: 4,592,458
[45] Date of Patent: Jun. 3, 1986

[54] CLUTCH DEVICE FOR WORKING VEHICLES

[75] Inventors: Ikuo Matsuki, Tokyo; Yasushi Itai; Kenji Nakamura, both of Saitama, all of Japan

[73] Assignee: Honda Giken Kogyo Kabushiki Kaisha, Tokyo, Japan

[21] Appl. No.: 633,323

[22] Filed: Jul. 23, 1984

[30] Foreign Application Priority Data

Jul. 22, 1983 [JP] Japan .................. 58-134827

[51] Int. Cl.[4] ............................................. F16D 43/24
[52] U.S. Cl. ................................ 192/83; 192/105 C
[58] Field of Search ............................ 192/83, 105 C

[56] References Cited

U.S. PATENT DOCUMENTS 1,740,265  12/1929  Putney ........................... 192/105 C

FOREIGN PATENT DOCUMENTS 19098  of 1908  United Kingdom ............ 192/105 C
995989  6/1965  United Kingdom ............ 192/105 C

*Primary Examiner*—Allan D. Herrmann
*Attorney, Agent, or Firm*—Armstrong, Nikaido, Marmelstein & Kubovcik

[57] ABSTRACT

A clutch device for working vehicles including a pressure member integrally rotatable with a crankshaft of an internal combustion engine of the vehicle, a centrifugal weight supported by the pressure member, the centrifugal weight being centrifugally movable in a higher revolution region than a predetermined number of revolutions of the crankshaft, a clutch outer member driven to be rotated by the pressure member, a plurality of drive friction plates integrally supported by the clutch outer member, the drive friction plates being axially movable, a clutch inner member fixedly provided with a plurality of driven friction plates frictionally engageable with the drive friction plates and having an output portion connected to a working implement of the vehicle, and a member for resiliently biasing the drive friction plates and the driven friction plates in their engagement direction. The clutch device, in which the clutch outer member is arranged to be axially movable, further comprises a restriction member for restricting the axial movement of the clutch outer member, and a control mechanism for controlling to shift the restriction member such that the clutch outer member has an axial position thereof let to be an arbitrary element of a set consisting of, with respect to the drive and driven friction plates, a normal-open position, a frictional-engagement permitting position under effect of the centrifugal movement of the centrifugal weights, and a normal-close position.

5 Claims, 14 Drawing Figures

CLUTCH DEVICE FOR WORKING VEHICLES

BACKGROUND OF THE INVENTION

1. Field of the Invention

The present invention relates to a clutch device for working vehicles.

2. Description of Relevent Art

As a clutch device for working vehicles such as cultivators, there is generally employed a centrifugal type clutch, in which a plurality of friction plates are interposed between a clutch inner as a driven member and a clutch outer as a drive member driven by means of a pressure plate, and a plurality of centrifugal weights arranged at the pressure plate side are adapted to open centrifugally in a higher revolution region than a predetermined number of revolutions of an engine, to thereby press the friction plates, whereby a clutch on state, i.e., a connected state of the clutch is established.

Such coventional clutch is unable to effect the clutch connection in a lower region than the predetermined number of revolutions of the engine and, actually, to serve for travelling or working at very low speeds, whereas such service may be necessary for certain farmland or working conditions; thus being inconvenient.

The present invention has been achieved to effectively overcome such shortcoming of a conventional clutch device for working vehicles such as cultivators.

SUMMARY OF THE INVENTION

An object of the present invention is to provide a clutch device for working vehicles, which is capable of a clutch connection by manual operation in a low revolution region incapable of putting centrifugal weights in service.

According to the present invention, there is provided a clutch device for working vehicles, comprising a pressure member integrally rotatable with a crankshaft of an internal combustion engine of the vehicle, a centrifugal weight supported by the pressure member, the centrifugal weight being centrifugally movable in a higher revolution region than a predetermined number of revolutions of the crankshaft, a clutch outer member driven to be rotated by the pressure member, the clutch outer member being movable axially of the pressure member, a plurality of drive friction plates disposed inside of and integrally supported by the clutch outer member, the drive friction plates being axially movable with the axial movement of the clutch outer member as well as with the centrifugal movement of the centrifugal weight, a clutch inner member freely rotatably fitted arranged on the crankshaft, the clutch inner member being fixedly provided with a plurality of driven friction plates frictionally engageable with the drive friction plates and having an output portion connected to a working implement of the vehicle, a resiliently biassing mechanism for resiliently biassing both the pressure member and the clutch outer member in an engagement direction of the drive and driven friction plates, the resiliently biassing mechanism being disposed between the pressure member and the clutch outer member, a restriction member for rotatably supporting the clutch outer member and restricting the axial movement of the clutch outer member, the restriction member being disposed on the axis of the crankshaft, and a control mechanism for controlling to shift the restriction member such that the clutch outer member has an axial position thereof restricted by the restriction member, to be an arbitrary element of a set consisting of, with respect to the drive and driven friction plates, a normal-open position, a frictional-engagement permitting position under effect of the centrifugal movement of the centrifugal weights, and a normal-close position.

Accordingly the present invention provides a clutch device for working vehicles, which though serving as a centrifugal clutch can cover a region where otherwise no centrifugal clutch is able to work, thus being permitted to raise the functionability as well as the practicability and wide applicability. Moreover, such various stages are available with a simple constitution.

The above and further features, objects and advantages of the present invention will more fully appear from the following detailed description of the preferred embodiments of the invention when the same is read in conjunction with the accompanying drawings.

BRIEF DESCRIPTION OF THE ACCOMPANYING DRAWINGS

DETAILED DESCRIPTION OF THE PREFERRED EMBODIMENTS

Figure 1:
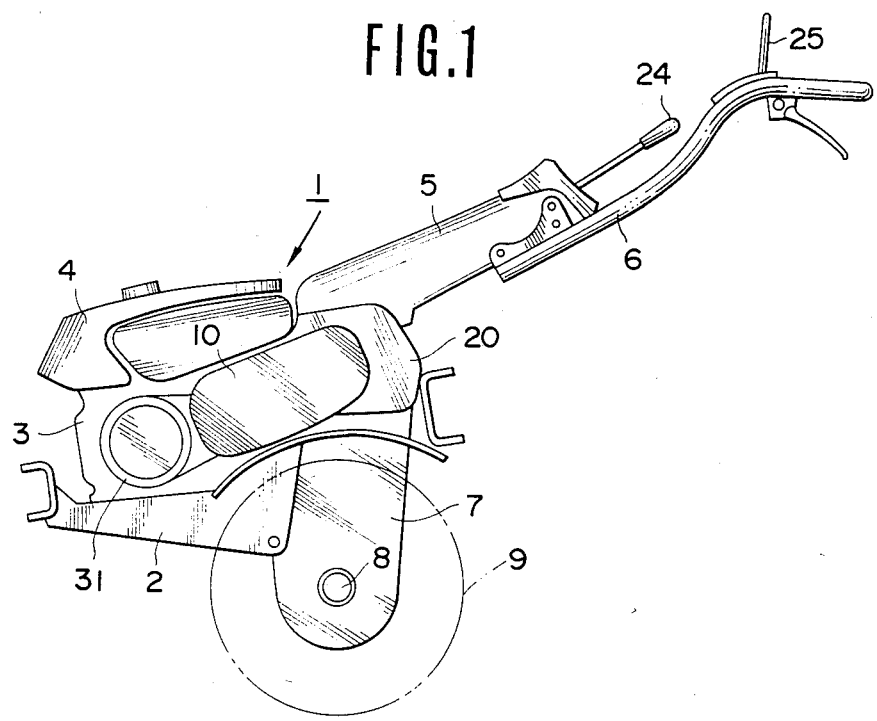
FIG. 1 is a side view of a cultivator.

Referring first to FIG. 1, designated at reference numeral 1 is a power cultivator as a working vehicle. The cultivator 1 has mounted on a vehicle body 2 thereof an engine 3 provided with a fuel tank 4 put thereon. Rearwardly of the vehicle body 2 is ascending a handle column 5 having, at the upper or distal end part thereof, a handle fork 6 provided with a hand lever 25 adapted for an on-off operation of a later-detailed clutch and, on the upper end face thereof, a shift lever 24 projected therefrom to be adapted for the operation of a later-described reduction gearing in a reduction case 7 extending downwardly from the proximal end of the column 5. Moreover, the cultivator 1 has in the lower part of the reduction case 7 a driving axle 8 supportingly driving a pair of ground-holding wheels 9, whereby the vehicle is adapted to travel, and at one side of the vehicle body 2 a belt cover 10 accommodating a later-described belt drive for driving a working implement 20 attached to the head part of the vehicle body 2, whereby the vehicle is permitted to put in service the working implement 20 while travelling, to thereby do work such as cultivation.

Figure 2:
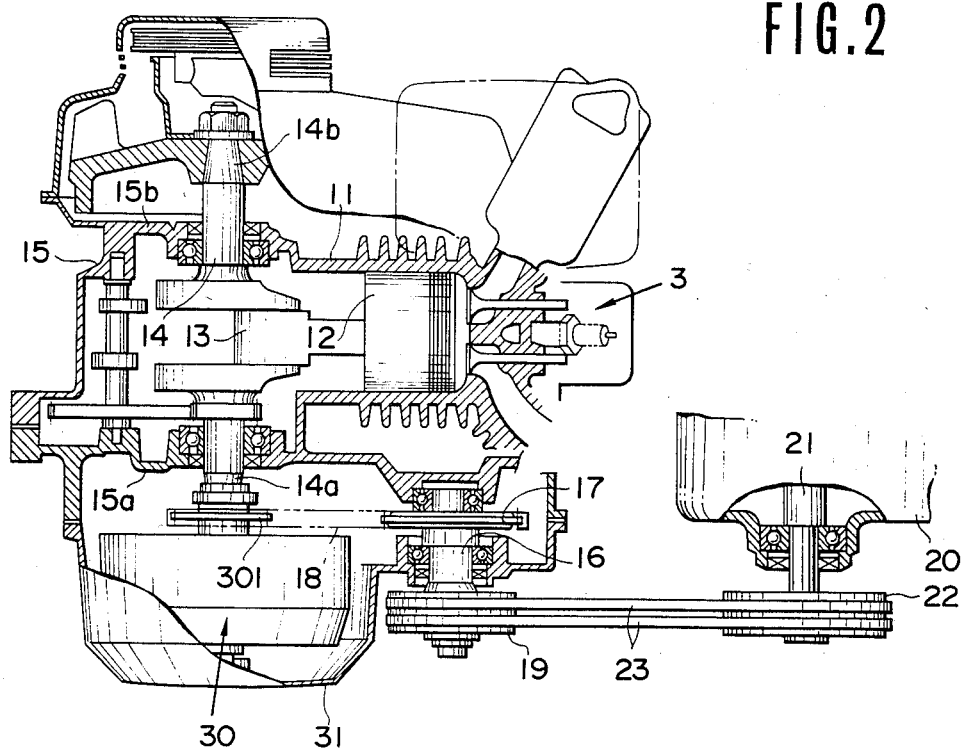
FIG. 2 is an explicative sectional plan of an engine and transmission system of the cultivator of FIG. 1.

Referring now to FIG. 2, the engine 3 has accommodated in a cylinder 11 thereof a piston 12 interconnected by means of a connection rod 13 with a crankshaft 14 arranged in a crankcase 15 transversely of the vehicle, which crankshaft 14 has both axial end portions 14a, 14b thereof extended each respectively outwardly of one of both lateral side walls 15a, 15b of the crankcase 15, to be coupled one 14a with the before-mentioned clutch 30. The clutch 30 has installed in the output mechanism thereof, rotatably about the axis of the crankshaft 14, a drive sprocket 301 connected through a chain 18 to a driven sprocket 17 fitted to be fixed on a middle shaft 16 which is spaced radially of and arranged in parallel with the crankshaft 14. On an extended end of the middle shaft 16 is installed a drive pulley 19 connected through a pair of drive belts 23 to a driven pulley 22 installed on an input shaft 21 of the working implement 20 disposed near the upper part of the reduction case 7. The belts 23 as well as the pulleys 19, 22 constitute the before-mentioned belt drive, while in FIG. 2 the belt cover 10 is removed to show the inner structure.

Figure 3:
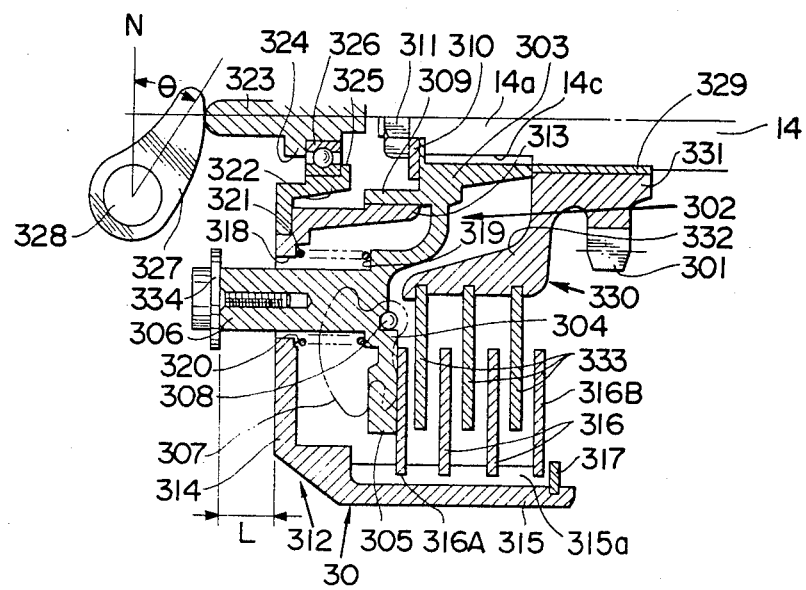
FIGS. 3 to 5 are explicative longitudinal sectional side views of a clutch of the cultivator of FIG. 1, which clutch has three working conditions consisting of a clutch-close state shown in FIG. 3, a centrifugal-clutch operable state shown in FIG. 4, and a clutch-close state shown in FIG. 5.
Figure 4:
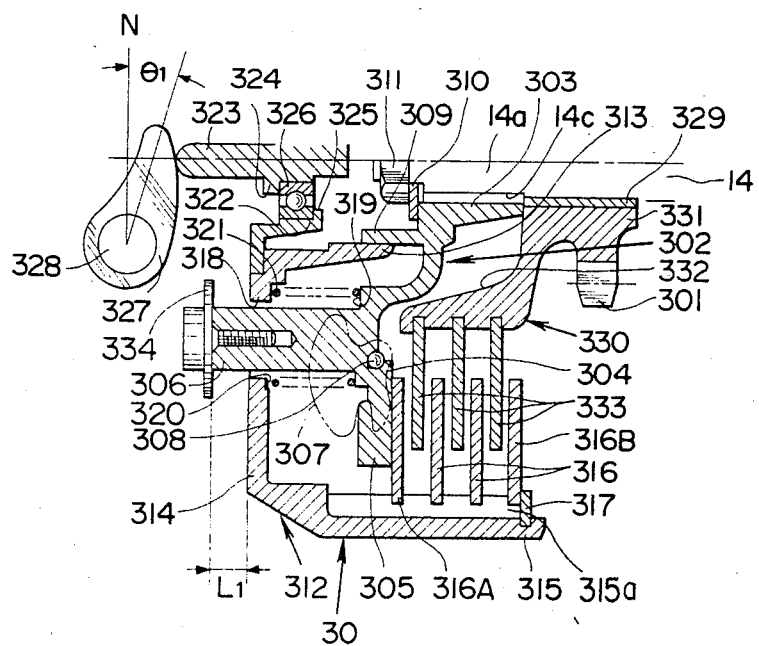
Figure 5:
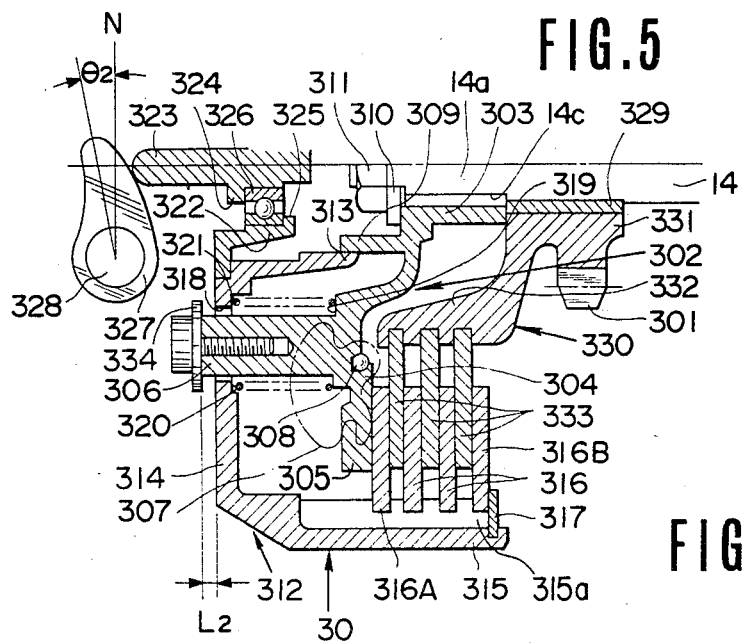
Figure 6:
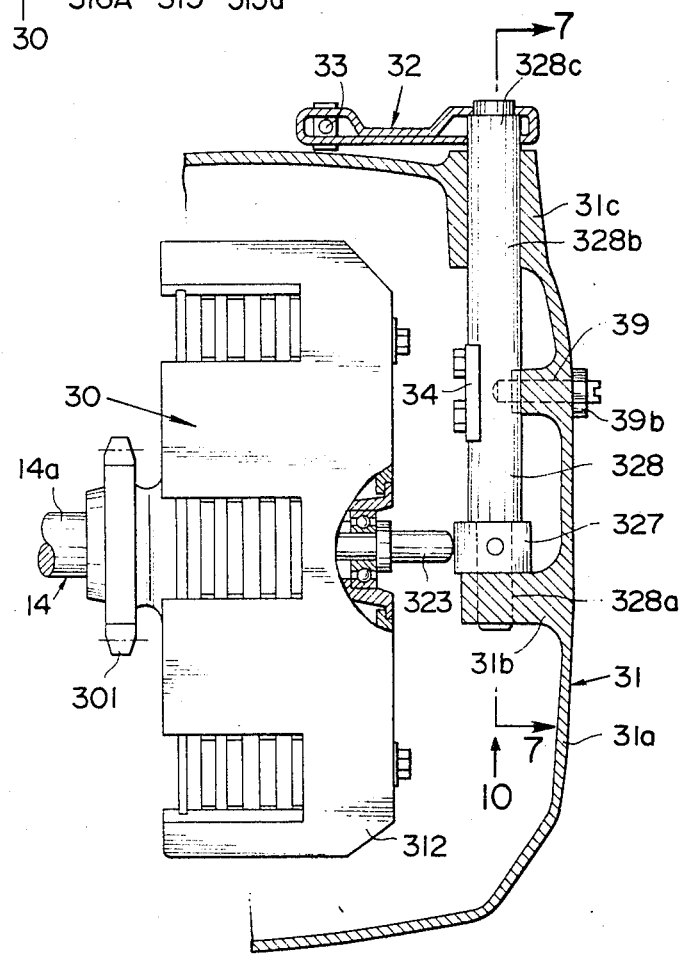
FIG. 6 is a longitidinal sectional view showing a first embodiment of the invention.

FIGS. 3, 4 and 5 show three characteristic shift conditions of the clutch 30, called herein "manual clutch off", "centrifugal clutch operable", and "manual clutch on", respectively.

With reference to all of FIGS. 3 to 5, the crankshaft 14 has fitted on the end portion 14a a proximal portion 303 of a substantially disc-like pressure plate 302 meshed therewith by way of a spline engagement 14c, while the axial movement of the pressure plate 302 is restricted by means of the combination of a washer 310 and a nut 311 screwed on the outermost part of the end portion 14a. The pressure plate 302 has an annular portion 304 formed to be provided at the inner side of the radially outward region thereof with a pressure-exerting part 305 and on the radially inward region thereof with a guide rod 306 projecting axially outwardly therefrom, the annular portion 304 having in the radially middle region thereof a plurality of centrifugal weights 307 pivoted thereon by respective pin members 308. The pressure plate 302 is rotatable, as a whole, integrally with the crankshaft 14.

The proximal portion 303 of the pressure plate 302 has projected axially outwardly thereof a cylindrical extension 309 surrounding the washer 310 and the nut 311, on which extension 309 is slidably fitted an inner sleeve 313 of a drum-like clutch outer member 312. The clutch outer member 312 has a flat disc-like end wall 314 radially extending from the axially outer end of the inner sleeve 313, the end wall 314 being inwardly bent along the circumference thereof to form an outer sleeve 315 in which a plurality of drive friction plates 316 are axially slidably fitted on splines 315a, which are axially formed on an inner surface of the outer sleeve 315, and arranged with axial gaps left between respective neighboring ones. The drive friction plates 316 are adapted to be all rotatable integrally with the clutch outer member 312, by bringing the outermost (left end in FIGS. 3, 4, 5) one 316A into abutment and frictional engagement with the pressure-exerting part 305 of the pressure plate 302 and checking the innermost (right end in the same Figures) one 316B with a stopper 317 provided near the inwardly open end of the outer sleeve 315 of the clutch outer member 312. The end wall 314 of the clutch outer member 312 has formed therethrough a guide hole 318 through which is guided the guide rod 306 of the pressure plate 302 extending axially outwardly of the wall 314. The clutch outer member 312 is resiliently biassed toward the clutch-closing direction thereof with a spring 321 coiled around the guide rod 306 and compressed to be interposed between an inner spring seat 319 put on the outside face of the annular portion 304 of the pressure plate 302 and an outer spring seat 320 put on the inside face of the end wall 314 of the clutch outer member 312.

In the outer end part of the inner sleeve 313 of the clutch outer member 312 is fitted a flanged bearing-boss member 322 having centered to be provided therethrough a restriction rod 323 arranged to be coaxial with the crankshaft 14, the boss member 322 supporting the restriction rod 323 in an axially movable manner by means of a bearing 326 interposed therebetween to be held by and between an axially outer stopper 324 radially outwardly stepped to be formed on the restriction rod 323 and an axially inner stopper 325 radially inwardly bent to be formed at the axially inner end of the boss member 322. On the axially outer end of the restriction rod 323 is abutting the distal end of an operation cam 327 secured at the proximal end thereof to an operation shaft 328, the operation cam 327 being rotatable about the axis of the operation shaft 328 by external manual operation.

The crankshaft 14 has further fitted thereon a proximal portion 331 of a clutch inner member 330 arranged to be adjacent to the proximal portion 303 of the pressure plate 302 and adapted to be freely rotatable by means of a bearing 329 fitted therebetween, the proximal portion 331 having the drvie sprocket 301 formed thereon, thereby constituting the output mechanism of the clutch 30. The clutch inner member 330 includes at the axially outer end thereof a cylindrical portion 332 radially outwardly extended and axially outwardly (to the left in FIGS. 3, 4, 5) extending, which cylindrical portion 332 has on the outer circumference thereof a plurality of driven friction plates 333 spaced at axial intervals and respectively inserted in the axial gaps of the drive friction plates 316.

In FIG. 3, there is shown the "manual clutch off" condition of the above-described clutch 30, which means a clutch-open state by manual operation. The manually operable cam 327 is held in a position inclined by a relatively large angle $\theta$ to the right in FIG. 3 from a reference line N. Accordingly, the friction rod 323 is pushed back by the cam 327 toward the crankshaft 14 (to the right in FIG. 3), causing also the clutch outer member 312 coupled therewith to correspondingly retreat against the resiliency of the spring 321. As a result, a relatively large clearance L is held between the end wall 314 of clutch outer member 312 and a stopper washer 334 secured to the axially outer end of the guide rod 306, so that the drive friction plates of the clutch outer member 312 and the driven friction plates 333 of the clutch inner member 330 have their clearances therebetween large enough to permit no effective frictional engagement therebetween even when the engine speed is raised so as to actuate the centrifugal weights 307.

In FIG. 4 corresponding to the "centrifugal clutch operable" condition, the cam 327 is rotated by an external operation through the operation shaft 328, from the position thereof shown in FIG. 3, to the left, to have a relatively small inclination angle $\theta_1$, while being still kept on the right of the reference line N. Accordingly, the restriction rod 323 is permitted to move from the position of FIG. 3 into an advanced position, which provides a smaller clearance L1 between the clutch outer member 312 and the stopper washer 334, thus rendering narrow the clearances between the drive and driven friction plates 316, 333 to the extent that they become effectively closed when the centrifugal weights 307 are brought into an outwardly opened state, i.e., pivoted about the respective pins 308 radially outwardly of the pressure plate 302 or counterclockwise in FIG. 4.

Namely, though FIG. 4 shows a state in which the engine 3 is stopped or the number of revolutions is lower than a predetermined value, when from such state the number of revolutions is raised higher than the predetermined value, the centrifugal weights 307 will outwardly open by centrifugual forces, axially inwardly pressing the outermost drive friction plate 316A and in turn the other drive friction plates 316 one by one, thus bringing them into frictional engagement with the driven friction plates 333, so that the torque of the pressure plate 302 as well as that of the clutch outer member 312 is frictionally transmitted to the clutch inner member 330, to be output through the sprocket 301.

In FIG. 5 showing the "manual clutch on" condition in which a clutch-close state is established by manual operation, the cam 327 is further rotated to the left in FIG. 5 into a negative or left inclination angle $\theta_2$ with respect to the reference line N, thereby further advancing the restriction rod 323, whereby also the clutch outer member 312 is further advanced to have established a considerably small clearance L2 between the clutch outer member 312 and the stopper washer 334, without clearances left between the drive and driven frictional plates 316, 333, so that a firm frictional engagement is made therebetween under the support of the spring 321 acting on the pressure-exerting part 305 of the pressure plate 302. Accordingly, even for numbers of revolutions lower than a working region of the centrifugal weights 307, the clutch-close state will be kept, thus permitting the engine power to be output through the drive sprocket 301. Namely, though being of a cetrifugal type, the clutch 30 is able to output the power even in a region of the number of revolutions in which no centrifugal effect is available, so that vehicle is capable of travelling and/or working at very low speeds.

There will be described below two examples of shifting mechanism as embodiments of the invention, which enables the foregoing three-staged clutch shifting, i.e., shift operations into "normal off", "centrifugal clutch on", and "normal on" stages corresponding to the "manual clutch off", "centrifugal clutch operable", and "manual clutch on" conditions, respectively.

Referring now to FIGS. 6 to 10 showing a first example of such mechanism, the clutch 30 is covered with a side cover 31 covering from outside either lateral wall of the crankcase 15 shown in FIG. 2. The side cover 31 includes a side wall 31a having formed inside thereof, at the middle part thereof and either end part thereof, middle and end boss portions 31b, 31c, respectively, for supporting a distal end part 328b of the operation shaft 328 and a proximal portion 328b thereof, respectively, the operation shaft 328 being arranged so as to cross the axis of the clutch 30 at right angles. The proximal portion 328b of the operation shaft 328, which poriton 328c is projected outwardly of the side cover 31, has fixed on a proximal end part 328c thereof the proximal part of an arm 32 fastened at the distal part thereof with an operation cable 33 of which pulling operation permits a pivotal movement of the arm 32 to rotate the operation shaft 328.

Figure 7:
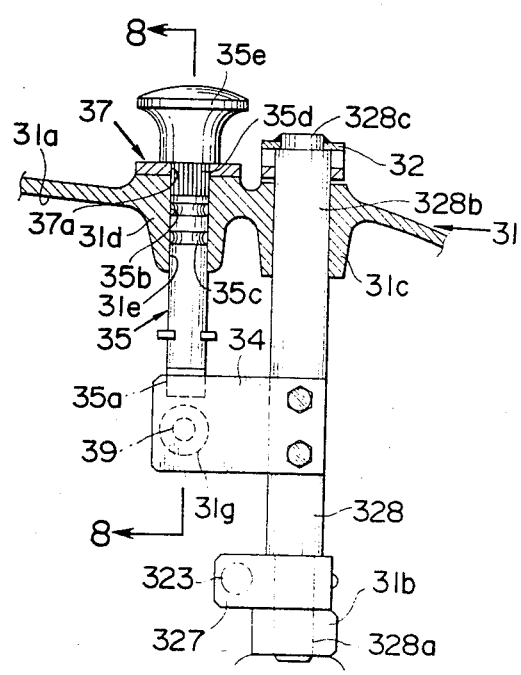
FIG. 7 is a sectional view taken along line 7—7 of FIG. 6.
Figure 8:
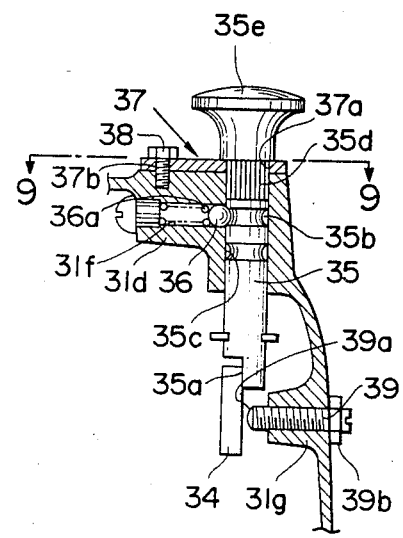
FIG. 8 is a sectional view taken along line 8—8 of FIG. 7.

On the distal part 328a of the operation shaft 328 is fixedly fitted the operation cam 327 on which the distal end of the restriction rod 323 of the clutch 30 is abutted. The shaft 328 has in the middle part thereof a restriction piece 34 fastened thereto, the restriction piece 34 being extended by a predetermined length in the tangential direction of the shaft 328, as shown in FIG. 7. On the inside of side wall of the side cover 31, there is further formed a boss portion 31d adjacent to the end boss portion 31c, in which boss portion 31d is axially slidably fitted a control rod 35 spaced from and arranged in parallel with the operation shaft 328, the control rod 35 having in the distal part thereof a cam portion 35a formed thereon and adapted so as to interfere with the distal part of the restriction piece 34. In the proximal part of the control rod 35, inside of a bearing hole 31e formed through the boss portion 31d, there are formed a pair of circumferential click slots 35b, 35c axially spaced from each other, the click slots 35b, 35c corresponding one to the "normal off" and "centrifugal clutch on" stages and the other to the "manual on" stage in this example, respectively, while the number as well as the staging of such click slots may be arbitrary. As shown in FIG. 8, in this example, in order to identify a position to be maintained for the "normal off" and "centrifugal clutch on" stages, the slot 35b has faced thereto an elongated hole 31f drilled laterally through the boss portion 31 i, in which hole 31f is provided a click ball 36 resiliently biassed to be brought into engagement with the slot 35b by means of a spring 36a, *thereby holding in position the control rod 35.*

Figure 9:
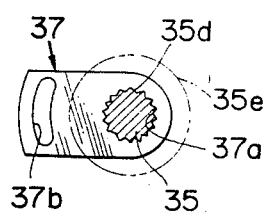
FIG. 9 is a sectional view taken along line 9—9 of FIG. 8.

As shown in FIG. 9, the control rod 35 has in the proximal part thereof a splined portion 35d formed thereon and exposed out of the cover 31, to be provided through and engagaed with a spline hole 37a formed through the distal part of an adjustment plate 37. In the proximal part of the adjustment plate 37, there is formed a hole 37b arcuately elongated with respect to the axis of the hole 37a. Moreover, through the arcuate hole 37b is provided a screw 38 for positioning and fixing the adjustment plate 37 relative to the boss portion 31d. Further, for the control rod 35, a thumb 35e is provided on the outer side relative to the splined portion 35d.

Besides above, the control rod 35 has provided, at the rear side of the restriction piece 34 engaging with the cam portion 35a, a stopper 39 as an adjustment screw screwed in a boss portion 31g formed between the middle and end boss portions 31b, 31c on the side wall 31a of the side cover 31, the stopper 39 facing at a distal end part 31g thereof the rear face of the restriction plate 34, while 39a in FIG. 8 is a lock nut.

Incidentally, with respect to FIGS. 6 to 10, the clutch shift condition is given for the "normal off" stage, in which the clutch-open state is established by manual operation, so that the centrifugal effect is available.

In this condition, as shown in FIG. 4, the restriction rod 323 is brought into abutment with the operation cam 327, which implies the advancement of the clutch outer member 312 and hence the clearances between the drive and driven friction plates 316, 333 are set such that these plates 316, 333 are to enter a frictional engagement with each other when the centrifugal weights 307 are centrifugally opened outwardly to act thereupon.

Figure 10:
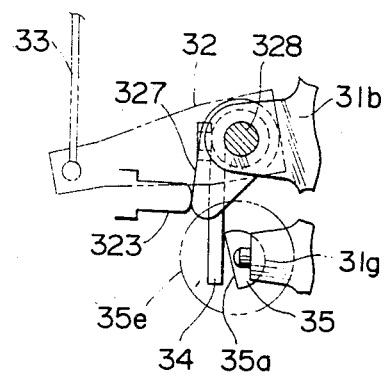
FIG. 10 is an explicative view taken at arrow 10 of FIG. 6.

In FIG. 10, when the cable 33 is pulled, the arm 32 will rotate clockwise in the same Figure, causing the operation cam 327 to rotate in the same direction, pushing the restriction rod 323 and retreatng the clutch outer member 312, thus reaching the "normal off" stage in which no centrifugal effect is available as in the case of in FIG. 3.

In the above-mentioned shifting mechanism, when adjusting a shift position for entering the "centrifugal clutch on" stage, the clutch outer member 312 is to be positioned in its advance position of FIG. 4 under the condition that the restriction piece 34 is brought into abutment with the cam 35a of the control rod 35 as shown in FIGS. 8 and 9, whereas when adjusting the clutch 30 as particular one, after loosening the screw 38 the adjustment plate 37 is to be rotated within limits of the arcuate hole 37b, whereby the cam portion 35a rotates and hence the restriction piece 343 is restricted of its rotation angle limit, then the screw 38 is to be tightened at the position where the centrifugal weights starts moving, before fixing the adjustment plate 37. Thereafter, the arm 32 will be released and the rotation of the sahft 328 will be stopped at the position where the restriction piece 34 abuts on the cam portion 35a, whereby the rotation of the cam 327 integral therewith becomes restricted, then a positioning will be made from the "normal off" stage to the "centrifugal clutch on" stage, and a setting as well as fine adjustment is to be made of the advance position of the clutch outer member 312 to be brought in a clutch-on state by the above-mentioned adjustment, i.e., of the clearances between the drive and driven friction plates 316, 333.

When shifting the "centrifugal clutch on" stage to the clutch "normal on" stage, the thumb 35e shown in FIGS. 8, 9 is to be slided in the pull-out direction thereof, whereby the ball 36 disengages from the slot 35b and engages with the next slot 35c, thus releasing the cam portion 35a from the engagement with the restriction piece 34, and the shaft 328 is to be biassed counterclockwise in FIG. 10 to thereby rotate the cam 327 in the same direction, thus advancing the restriction plate 323, achieving the condition of FIG. 4, whereby the friction plates 316, 333 are brought into engagement by the spring load of the spring 321, thus causing the abutment between the restriction piece 34 and the distal end part 39a of the stopper 39 to restrict the rotation limit, the angle of which rotation is adjustable by the adjustment of the degree of projection of the stopper 39.

Referring now to FIGS. 11 to 14 showing a second example of a clutch mechanism according to the invention, designated at reference numeral 41 is a side cover. The side cover 41 has formed on a side wall 41a thereof a boss portion 41b provided therethrough with an elongated hole 41c opening outwardly, in which hole 41c a round rod-like shaft 428 is rotatably inserted to be supported. The distal part of the shaft 428 is half-cut to provide a semilunar cam portion 427 to which is arranged in a facingly and off-centeredly crossing manner the distal end of a restriction rod 423 provided on a clutch outer member 412, the distal end of restriction rod 423 being axially movably supported by a bearing boss portion 41d formed on the boss portion 41b in an off-centeredly crossing manner with respect to the elongated hole 41c. The operation shaft 428 has an extension 428a extending outwardly of the cover 41, to which extension 428a is fastened a proximal end part 42a of an arm 42 connected at a distal end 42b thereof through a forked metal 43 to a cable 44. On the opposite side of the arm 42 relative to the cable 44 is abutting a roller 4a of a substantially L-like operation lever 45 pivotably supported at the center or corner point of the L-form thereof.

Figure 11:
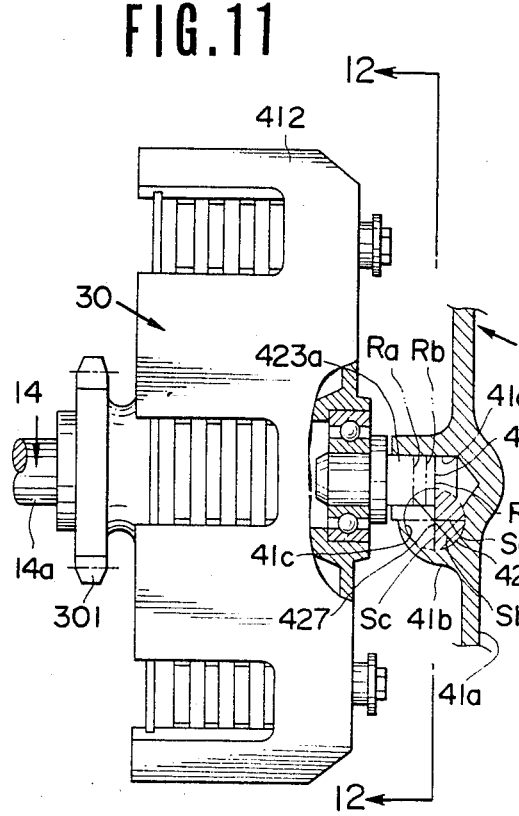
FIG. 11 is a view similar to FIG. 6, showing a second embodiment of the invention.
Figure 12:
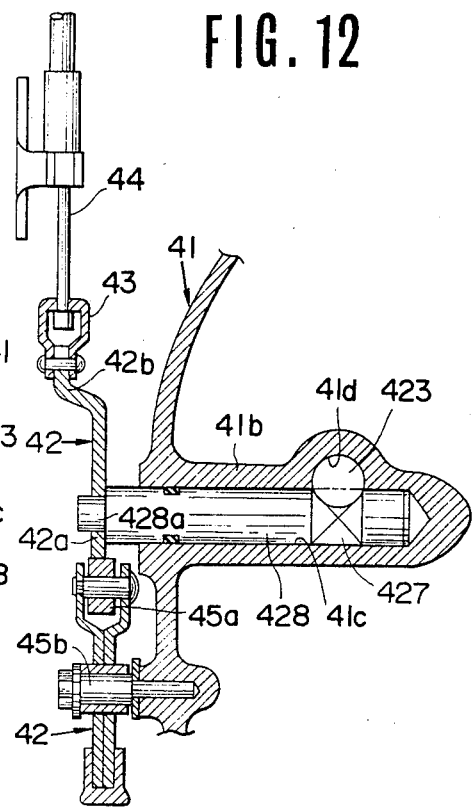
FIG. 12 is an explicative sectional view taken along line 12—12 of FIG. 11.
Figure 13:
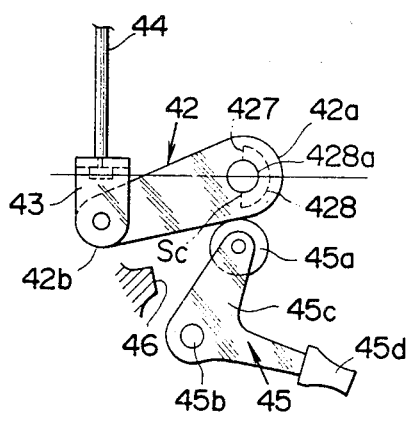
FIGS. 13 and 14 are explicative illustrations showing a shifting mechanism including a clutch normal-close stage shown in FIG. 13 and a centrifugal-clutch operable stage shown in FIG. 14.
Figure 14:
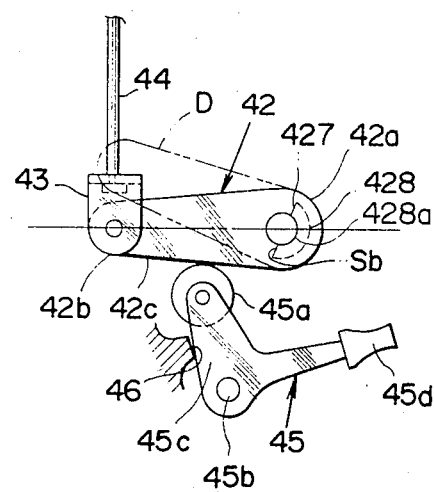

Also in this example, the clutch mechanism has three chracteristic shift stages, in which a "normal on" stage and a "centrifugal clutch on" stage will be mainly described below with reference to FIGS. 11 to 13 showing a state of the former stage and FIG. 14 showing a state of the latter stage.

In FIG. 14, either arm portion 45c of the L-like operation lever 45 is brought into abutment with a stopper 46 projectingly formed on a part of the cover 41, and has abutted on a roller 45a thereof one side edge 42c of the arm 42 inclined together with the semilunar cam portion 427 thereof in a position Sb shown by solid line in FIG. 14, so that the arm 42 is prevented from further downward inclination or counterclockwise rotation in the same Figure even when the cable 44 is loosened. Under such condition, the restriction rod 423 is restricted at an advanced position Rb thereof shown by chain line in FIG. 11, thus resulting in the "centrifugal clutch on" condition of FIG. 4, the advanced position Rb being kept by the abutment of the lever 45 on the stopper 46.

Again in FIG. 14, when the cable 44 is pulled upwardly, the arm 42 is to rotate clockwise to a position D shown by chain line, bringing the cam portion 427 into a horizontal position Sa thereof shown by chain line in FIG. 11, thereby retreating the restriction rod 423, thus resulting in the "manual clutch off" condition of FIG. 3. Under this condition, when the cable 44 is loosened, the arm 42 is to again abut on the roller 45a at the side edge 42c, whereby the "centrifugal clutch on" state shown by solid line in FIG. 14 is maintained. Namely, the clutch mechanism is prevented against the shifting to a "normal on" stage. Incidentally, when rotated clockwise by using a thumb 45d, the lever 45 becomes counterclockwise rotatable and is able to confront the end face of the restriction rod 423, which rod 423 may thus be advanced to the end of an advance stroke thereof, where the clutch outer member 412 permits the spring 21 to establish an effective engagement between the drive and driven friction plates 316, 333, thus attaining in the "manual clutch on" condition of FIG. 5 by no more than the operation of the lever 45.

As will be understood from the foregoing description, according to the present invention, a clutch device for working vehicles such as cultavitors, which clutch device includes a centrifugal clutch, is able to enter a clutch "normal on" state thereof even in a low region of number of revolutions in which the centrifugal clutch is able to work, thus favorably permitting the working vehicle to do work or travel at very low speeds in the low revolution region and to be facilitated for the enlargement of the scope of service as well as increase in the level of practicability and wide applicability, without the need of substantial structural modification of the centrifugal clutch. The above and other various advantages are attainable by shifting, in a three-staged manner using a shifting mechanism, the axial movement of a restriction member adapted for on-off control of a clutch outer member, with a simple modification to conventional shift mechanism, thus permitting an easy and inexpensive enlargement of the function of centrifugal clutch.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrective. The scope of the invention is indicated by the appended claims rather than by the foregoing description.

I claim:

1. A clutch device for working vehicles, comprising:

a pressure member integrally rotatable with a crankshaft of an internal combustion engine of the vehicle;

a centrifugal weight supported by said pressure member;

said centrifugal weight being centrifugally movable in a higher revolution region than a predetermined number of revolutions of said crankshaft;

a clutch outer member driven to be rotated by said pressure member;

said clutch outer member being movable axially of said pressure member;

a plurality of drive friction plates disposed inside of and integrally supported by said clutch outer member;

said drive friction plates being axially movable with the axial movement of said clutch outer member as well as with the centrifugal movement of said centrifugal weight;

a clutch inner member freely rotatably fitted arranged on said crankshaft, said clutch inner member being fixedly provided with a plurality of driven friction plates frictionally engageable with said drive friction plates and having an output portion connected to a working implement of the vehicle;

resiliently biassing means for resiliently biassing both said pressure member and said clutch outer member in an engagement direction of said drive and driven friction plates;

said resiliently biassing means being disposed between said pressure member and said clutch outer member;

a restriction member for rotatably supporting said clutch outer member and restricting the axial movement of said clutch outer member;

said restriction member being disposed on the axis of said crankshaft; and control means for controlling to shift said restriction member such that said clutch outer member has an axial position thereof restricted by said restriction member, to be an arbitrary element of a set consisting of, with respect to said drive and driven friction plates, a normal-open position, a frictional-engagement permitting position under effect of the centrifugal movement of said centrifugal weights, and a normal-close position.

2. A clutch device according to claim 1, wherein:

said control means comprises an operation shaft rotatable by an external operation, a cam disposed on said operation shaft, said cam abutting on the distal end of said restriction member, a restriction piece for restricting the movement of said restriction shaft, said restriction piece being disposed on said operation shaft, a manual control rod arranged to be engageable with and disengageable from said restriction piece.

3. A clutch device according to claim 2, wherein:

said control rod has a cam formed on a portion at which said operation shaft is engaged with said restriction piece.

4. A clutch device according to claim 3, wherein:

said control rod is extended outwardly of a crankcase cover of the vehicle and has a spline in the vicinity of the outer end thereof;

said spline is provided through and engaged with a spline hole of an adjustment plate provided on the outside of said crankcase cover; and said adjustment plate has an arcuately elongated hole formed about the axis of said spline hole.

5. A clutch device according to claim 1, wherein: said control means comprises an operation shaft rotatable by an external operation through a clutch wire, a cam disposed on said operation shaft and abutted on the distal end of said restriction member, an arm member fixed to an end part of said operation shaft and connected at one end thereof to said clutch wire, a manual operation lever for permittingly restricting the rotating movement of said operation shaft, and said operation lever abutting at an end part thereof on an edge portion of said arm member.

* * * * *